(12) United States Patent
Caretta

(10) Patent No.: US 6,382,283 B1
(45) Date of Patent: May 7, 2002

(54) TIRE FOR VEHICLE WHEELS INCLUDING SIPES

(75) Inventor: Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/471,261

(22) Filed: Dec. 23, 1999

Related U.S. Application Data
(60) Provisional application No. 60/118,528, filed on Feb. 2, 1999.

(30) Foreign Application Priority Data

Dec. 23, 1998 (EP) ............................................. 98830779

(51) Int. Cl.$^7$ ......................... B60C 11/11; B60C 11/12; B60C 11/13; B60C 101/02; B60C 103/04
(52) U.S. Cl. ............................ 152/209.18; 152/209.21; 152/209.22; 152/209.23; 152/209.24; 152/902; 152/903; 152/DIG. 3
(58) Field of Search ....................... 152/209.18, 209.21, 152/209.22, 209.23, 209.24, DIG. 3, 902, 903, 209.15; 156/110.1

(56) References Cited

U.S. PATENT DOCUMENTS

| | | | | | |
|---|---|---|---|---|---|
| 2,327,057 | A | * | 8/1943 | Ofensend | 152/209.21 |
| 3,768,535 | A | * | 10/1973 | Holden | 152/209.24 |
| 4,298,046 | A | | 11/1981 | Herbelleau et al. | |
| 5,127,455 | A | * | 7/1992 | Remick | 152/209.24 |
| 5,386,861 | A | | 2/1995 | Overhoff et al. | |
| 5,679,186 | A | | 10/1997 | Tagashira et al. | |
| 5,795,415 | A | | 8/1998 | Campana et al. | |
| 6,129,127 | A | * | 10/2000 | Nicotina | 152/903 |

FOREIGN PATENT DOCUMENTS

| | | | | |
|---|---|---|---|---|
| DE | 39 43 014 A1 | | 6/1990 | |
| DE | 197 11 852 A1 | | 12/1997 | |
| EP | 0384182 A1 | | 8/1990 | |
| EP | 411773 | * | 2/1991 | 152/209.24 |
| EP | 0498287 A1 | | 8/1992 | |
| EP | 0788900 A1 | | 8/1997 | |
| EP | 0810104 A1 | | 12/1997 | |
| FR | 809470 | | 3/1937 | |
| GB | 2093777 A | | 9/1982 | |
| JP | 2-189205 | * | 7/1990 | 152/209.23 |
| JP | 3-10913 | * | 1/1991 | 152/209.18 |
| JP | 3-70605 | * | 3/1991 | 152/209.24 |
| JP | 3-182814 | * | 8/1991 | 152/209.22 |
| JP | 5-139120 | * | 6/1993 | 152/209.18 |

OTHER PUBLICATIONS
English Language Translation of FR 809,470.
English Language Abstract of DE 39 43 014 A1.
English Language Abstract of DE 197 11 852 A1.
English Language Abstract of EP 0,384,182 A1.
English Language Abstract of EP 0,788,900 A1.

\* cited by examiner

*Primary Examiner*—Steven D. Maki
(74) *Attorney, Agent, or Firm*—Finnegan, Henderson, Farabow, Garrett & Dunner, L.L.P.

(57) ABSTRACT

A tire for vehicle wheels, provided with a tread band, includes a plurality of raised blocks confined between at least two longitudinal grooves, at least two transverse grooves meeting the longitudinal grooves, and a first and second series of sipes formed in the blocks to divide each block into a plurality of flexible portions. The flexible portions have a grip edge in the form of an acute angle on the outer rolling surface of the tread band. Each of the transverse grooves is confined between a first side, substantially normal to the outer rolling surface of the tread band, and a second side, diverging from the first side toward the outer rolling surface of the tread band. The second side of each of the transverse grooves has an orientation concordant with that of the sipes of a corresponding block, relative to the outer rolling surface of the tread band.

16 Claims, 2 Drawing Sheets

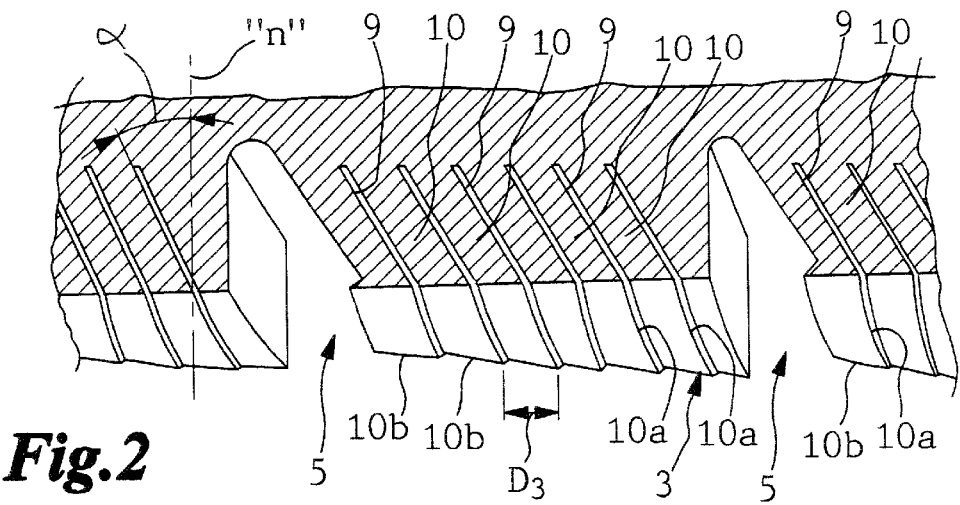
*Fig.2*
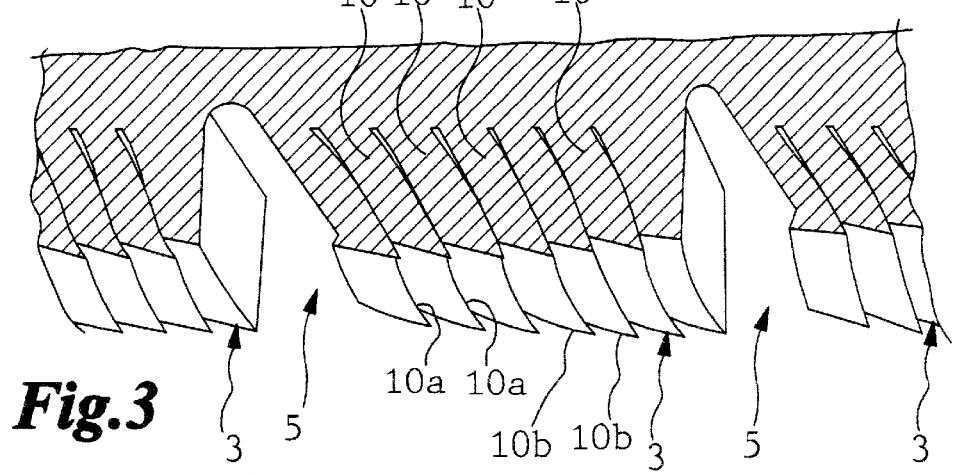
*Fig.3*
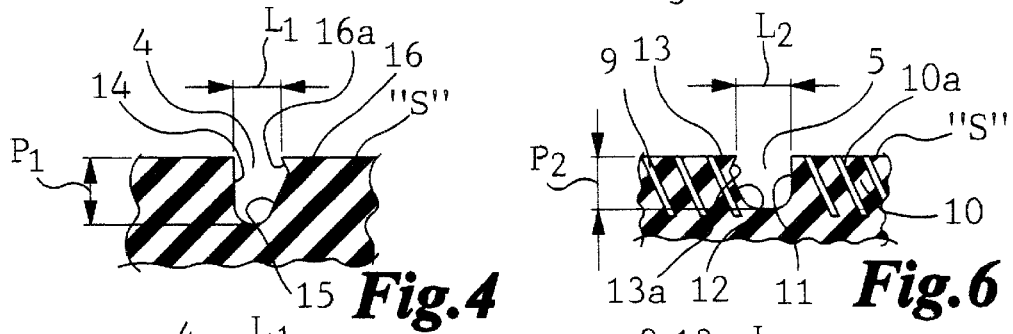
*Fig.4*   *Fig.6*
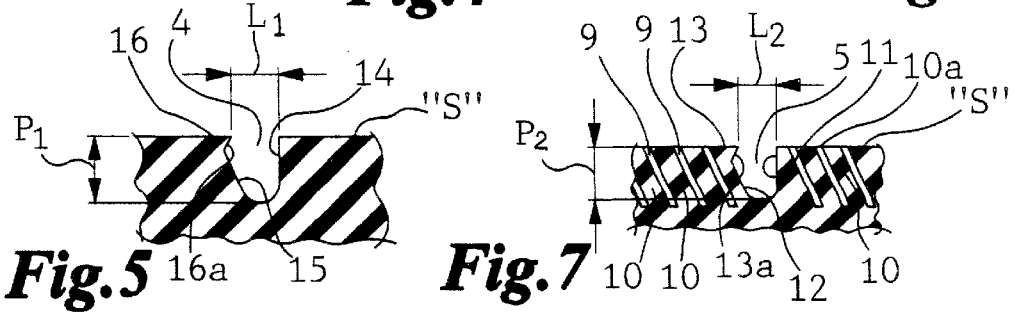
*Fig.5*   *Fig.7*

TIRE FOR VEHICLE WHEELS INCLUDING SIPES

Applicant claims the right of priority under 35 U.S.C. § 119(a)–(d) based on patent application No. 98830779.9, filed Dec. 23, 1998, in the European Patent Office; additionally, Applicant claims the benefit under 35 U.S.C. § 119(e) based on prior-filed, copending provisional application No. 60/118,528, filed Feb. 2, 1999, in the U.S. Patent and Trademark Office.

The present invention relates to a tire for vehicle wheels of the type provided with a tread band comprising: a plurality of raised blocks each peripherally confined between at least two longitudinal grooves substantially extending circumferentially of the tire, and at least two transverse grooves joining said longitudinal grooves; a first series of sipes and a second sipes formed in said blocks, each according to an inclined orientation relative to a direction normal to an outer rolling surface of the tread band, to divide each block into a plurality of flexible portions disposed circumferentially in side by side relationship, each having a grip edge in the form of an acute angle on said outer rolling surface.

In more detail, the invention is directed to a tire of the so-called "winter" type and to a method of making such a tire, the tread band of which has a tread pattern particularly suitable for running on snow-covered and/or frozen roadways.

Tires of the winter type are required to have, in addition to excellent behavioural features as regards running on a snow-covered roadway, also a good qualitative level in connection with other operation features such as rolling smoothness, running behaviour on a wet surface and kilometric yield.

Other features that, although of less importance than the preceding ones, also help in giving a better or worse qualitative evaluation of a winter tire are running behaviour on a dry surface and quietness on running.

The above mentioned behavioural and operational features are determined by making appropriate circumferential and transverse grooves into the tread band, which grooves must be suitably sized and oriented, so as to give rise to formation of blocks normally aligned in rows disposed consecutively in side by side relationship and extending circumferentially of the tire.

In addition, the presence of an appropriate lamelliform pattern in the blocks, i.e. a thick series of narrow cuts disposed consecutively in side by side relationship in a circumferential direction and oriented substantially transversely of the rolling direction is significant indispensable as regards achievement of particular behavioural running features on a snow-covered roadway.

The task of these narrow cuts, more simply called "sipes" is substantially that of picking up and efficiently retaining the snow, since friction created by snow against snow is, as known, greater than friction of rubber on snow.

In U.S. Pat. No. 4,298,046, herein mentioned as an example of the state of the most pertinent prior art, it is described a winter tire the tread band of which has four circumferential rows of blocks, confined by substantially straight circumferential grooves and transverse grooves, straight as well, having walls substantially normal to an outer rolling surface, on which contact between the tread band and roadway surface occurs.

For the purpose of achieving improvements in terms of traction power and grip performance on braking it is provided that blocks belonging to the axially outer rows, located close to the tire shoulders, should have sipes oriented according to an inclination of about 30° relative to the rolling surface and extending on the rolling surface itself according to a substantially straight extension parallel to the tire rotation axis. Blocks belonging to the circumferential rows placed in the middle region of the tire have sipes similar to those formed in the blocks belonging to the shoulder rows, but inclined in the opposite direction relative to the latter.

In each block, sipes define a plurality of flexible portions that, due to the inclination of the sipes themselves, exhibit a sharp-corner edge capable of exerting an efficient grip on the roadway surface. By assigning a given direction of rotation to the tire, the acute-angle edges of the flexible portions belonging to the blocks of the shoulder rows are made efficient during the acceleration step, while the acute-angle edges of the flexible portions of the blocks belonging to the centre rows exert their efficiency during the braking step.

In Patent EP 498287 it is described a tire in which the transverse grooves delimiting the tread band blocks have an inclined orientation relative to a direction normal to the rolling surface, in order to improve evenness in wear of the blocks themselves. The transverse grooves belonging to the blocks of the circumferential shoulder rows have an opposite orientation relative to that of the blocks belonging to the centre rows. In addition a different direction of rotation is assigned to the tire, depending on whether it is associated with a driving wheel or a driven wheel of the motor-vehicle.

In patent EP 384182 and in the Italian Patent Application MI94A000309 tires for heavy duty vehicles are described which are provided with circumferential rows of blocks delimited by transverse cuts of reduced width having an inclined orientation relative to a direction normal to the rolling surface of the tread band.

In accordance with the present invention it has been found advantageous for the blocks in the tread band to be provided with sipes having an inclined orientation relative to the rolling surface and a curvilinear transverse extension, or in any case such arranged as to define a concavity turned towards the acute-angle grip edge exhibited by one of the two flexible portions delimited by the sipe itself. Thus the grip effect on traction and/or braking is improved, above all on a snow-covered and/or frozen roadway, in that the consequent conformation of each flexible portion makes this portion substantially behave like a small shovel cutting and picking up the snow and accumulating and holding it at the inside of the sipe.

In more detail, it is an object of the present invention to provide a tire for vehicle wheels, characterized in that each sipe extends transversely of the block according to a concave extension towards the grip edge of the corresponding flexible portion.

Preferably, sipes belonging to the first series and the second series are distributed in respective circumferential rows disposed axially in side by side relationship and advantageously arranged in an alternate sequence.

More particularly, each circumferential row of sipes belonging to the first and second series respectively is preferably associated with a respective circumferential row of blocks.

Advantageously, each sipe may be provided to extend transversely of the block substantially over the whole width thereof.

Each sipe may possibly have at least one end portion of reduced depth close to the longitudinal groove delimiting the respective block.

In a preferential embodiment, each sipe has a substantially curvilinear extension symmetric with the longitudinal centre line of the respective block.

In addition, each of said flexible portions may be provided to have opposite ends inclined to the extension direction of the corresponding longitudinal grooves, to define side toothings projecting into the longitudinal grooves in said block.

In accordance with a further aspect of the invention application of which can also take place independently of the conformation of the transverse extension of the sipes, it has been found advantageous for each of said transverse grooves to be confined between a first side substantially normal to the outer rolling surface of the tread band, and a second side diverging from the first side towards the rolling surface itself.

Preferably said second side, relative to the rolling surface, has an orientation similar to or concordant with that of the sipes of the corresponding block.

It may be also provided that each block should have, close to said rolling surface, at least one transverse edge projecting towards the corresponding transverse groove to define an undercut with the second side of the transverse groove itself.

Advantageously, each of said transverse grooves extends in a direction substantially parallel to the extension of the sipes, and the transverse grooves belonging to blocks disposed mutually in side by side relationship in an axial direction are disposed consecutively so as to define substantially continuous transverse grooves extending according to an undulated extension.

It may be conveniently provided that each of said longitudinal grooves should be confined between a first side substantially normal to the rolling surface and a second side diverging from the first side in the direction of the rolling surface itself.

Each block may also have, close to the rolling surface, at least one longitudinal edge projecting towards the corresponding longitudinal groove, to define an undercut with the second side of the longitudinal groove itself.

Preferably, in each of said longitudinal grooves the mutual positioning of the first and second sides is inverted relative to the mutual positioning of the first and second sides of the circumferentially contiguous longitudinal grooves.

Conveniently, the longitudinal grooves are consecutively disposed so as to define substantially continuous circumferential grooves.

Preferably, each of said longitudinal grooves has an inclined extension relative to a direction circumferential to the tire, so that each of said circumferential grooves extends in the form of a broken line.

In a preferential embodiment of the tire in accordance with the invention, at least two circumferential rows of shoulder blocks are provided which extend close to the opposite side edges of the tread band, as well as one or more circumferential rows of centre blocks disposed symmetrically relative to an equatorial plane of the tire, the blocks disposed on either side of the equatorial plane respectively having correspondingly opposite orientations.

In accordance with a different aspect, the invention relates to a method of increasing snow trapping in tread patterns for tires of vehicle wheels, comprising the steps of: making rows of blocks, each confined between longitudinal and transverse grooves relative to a circumferential extension direction of the tire; dividing each block into a plurality of flexible portions by a plurality of sipes extending inwardly of the tire starting from a radially outer rolling surface; shaping said sipes into a concave line on said rolling surface; and inclining each sipe preferably at an angle included between 20° and 35° relative to a straight line normal to the rolling surface.

Further features and advantages will become more apparent from the detailed description of a preferred non-exclusive embodiment of a tire for vehicle wheels in accordance with the present invention. This description will be taken hereinafter with reference to the accompanying drawings, given by way of non-limiting example, in which:

FIG. 2 is a fragmentary perspective bottom view highlighting a block of the tread band, sectioned in a diametral plane relative to the rotation axis of the tire;

FIG. 3 is a representation similar to FIG. 2, highlighting the deformation undergone by the flexible portions of the block by effect of forces produced in the footprint;

FIGS. 4 and 5 show the profile in cross-section of the longitudinal grooves of the tread band, sectioned along lines IV and V in FIG. 1;

FIGS. 6 and 7 show the profile in section of the transverse grooves delimiting the blocks of the shoulder rows and the centre rows respectively in the tread band, sectioned along lines VI and VII in FIG. 1;

Figure 1:
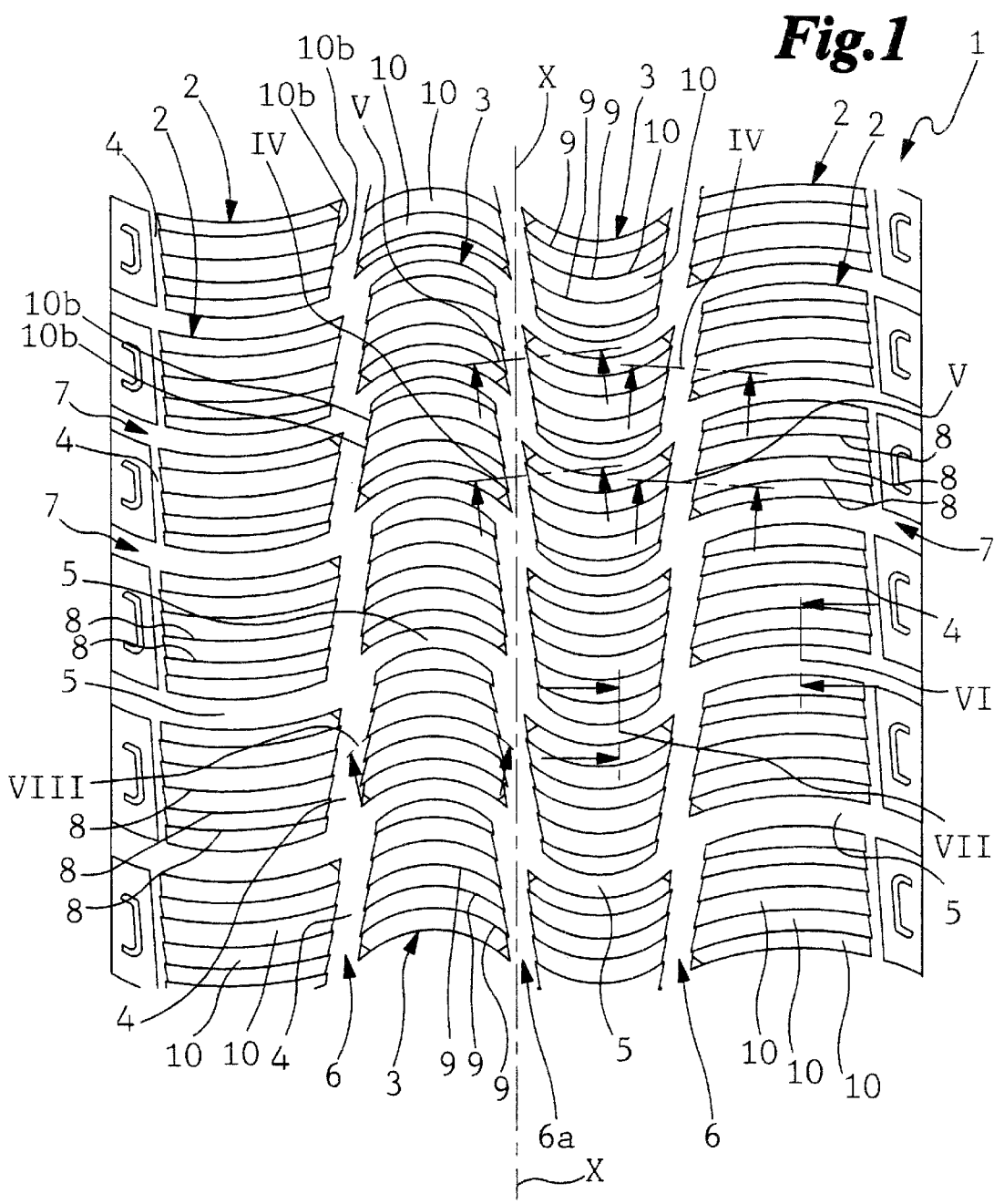
FIG. 1 is a fragmentary plan view illustrating a tread band of a tire made in accordance with the present invention.

Referring particularly to FIG. 1, a tread band of a tire made in accordance with the present invention has been generally identified by reference numeral 1, the remaining parts of the tire being not shown as they can be obtained in any manner convenient for a person skilled in the art.

Defined on the tread band 1 is a plurality of raised blocks 2, 3 each peripherally confined between at least two longitudinal grooves 4 substantially extending circumferentially of the tire, and at least two transverse grooves 5 meeting the longitudinal grooves 4. Preferably, the longitudinal grooves 4 are consecutively disposed along the circumferential extension of the tire, to define substantially continuous circumferential grooves 6, 6a delimiting respective circumferential block tows 2, 3. In more detail, in the example shown, at least two circumferential side grooves 6 are defined which are symmetrically spaced apart from an equatorial median plane X—X of the tire so as to delimit at least two shoulder block 2 rows, extending along the opposite side edges of the tread band 1, and one or more centre block 3 rows disposed symmetrically relative to the equatorial plane X—X. In the embodiment shown, the centre blocks 3 are divided into two circumferential rows separated by a central circumferential groove 6a disposed in the equatorial plane X—X.

In a preferential embodiment, the longitudinal grooves 4 have an orientation inclined to the circumferential extension direction, so that each of the circumferential 6 and central 6a grooves substantially extends in the form of a broken line.

By way of example, each longitudinal groove 4 has a depth $P_1$ included between 8 and 11 mm, and a width $L_1$ included between 5 and 8 mm measured on an outer rolling surface "S" of the tread band 1.

The transverse grooves 5 too have a depth $P_2$ included, just as an indication, between 8 and 11 mm, preferably equal to that of the longitudinal grooves 4, and a width $L_2$ included between 4.5 and 8.5 mm, progressively increasing larger on moving away from the equatorial plane X—X. In other words, the width of the transverse grooves 5 belonging to the shoulder blocks 2 is preferably greater than the width of the transverse grooves 5 belonging to the centre blocks 3.

As viewed from FIG. 1, the transverse grooves 5 belonging to the different block rows 2, 3 are consecutively disposed to define substantially continuous transverse grooves 7, of an undulated course, in such a manner that blocks 2, 3 disposed on either side of the equatorial plane X—X respectively are oriented in respectively opposite directions. In other words, it is preferably provided for the tread band 1 of the tire in accordance with the invention to have a pattern of the symmetric biodirectional type, the behavioural features of which are not substantially affected by the direction of rotation imposed to the wheel.

Also provided is at least one first series of sipes 8 and a second series of sipes 9 formed in blocks 2, 3 with a depth $P_3$ close, just as an indication, to the depth $P_1$ of the longitudinal 4 and transverse 5 grooves. Sipes 8, 9 have a width preferably not exceeding 0.5 mm and are circumferentially spaced apart from each other of a value $D_3$ included, just as an indication, between 3 and 6 mm, so as to divide each block 2, 3 into a plurality of flexible portions 10 disposed circumferentially in side by side relationship. Sipes of the first and second series 8, 9 have each an orientation inclined at an angle α included between 20° and 35° and preferably equal to 25°, relative to a direction "n" normal to the rolling surface "S", so that each flexible portion 10 has an acute-angle grip edge 10a, on the rolling surface itself. Sipes 8, 9 belonging to the first and second series respectively are distinguishable from each other due to the fact they have respectively opposite inclination directions.

Preferably, sipes 8, 9 belonging to the first and second series are distributed in respective circumferential rows disposed axially in side by side relationship, preferably in an alternate sequence. In more detail sipes 8, 9 belonging to each of the first and second series can be associated with each of the circumferential rows formed by blocks 2, 3 respectively, in such a manner that each block row 2, 3 has sipes 8, 9 oriented in the opposite direction relative to the sipes of the row or rows of adjacent blocks.

Advantageously, as viewed from FIG 1, each sipe 8, 9 extends transversely of the respective block 2, 3 in a curvilinear extention substantially symmetric relative to the transverse centre line of the block itself, or at all events in such a manner that it has a generally concave extension towards the corresponding grip edge 10 exhibited by one of the two flexible portions 10 delimited by the sipe itself.

Figure 8:
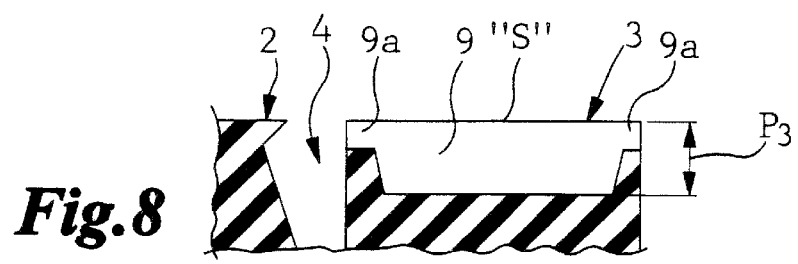
FIG. 8 is a section taken along line VIII in FIG. 1, highlighting the profile in longitudinal section of a sipe.

Preferably, each sipe 8, 9 substantially extends over the whole width of the respective block 2, 3. In any case, the possibility of providing sipes 8, 9 extending in the block 2, 3 only over part of its width is not to be excluded. In addition, as shown in FIG. 8, it may be also advantageously provided for each sipe 8, 9 to have at least its end portion 9a of reduced depth close to the longitudinal groove 4 delimiting the respective block 3. The depth of the sipe 8, 9 at the end portions 9a can be included, just as an indication, between a zero value and half the depth $P_3$ of the cut itself.

The conformation and positioning of the sipes 8, 9 in accordance with the invention is adapted to greatly improve the grip effect of the tire for the purpose of improving performance thereof, in particular on acceleration and braking.

In fact, as can be seen from a comparison between FIGS. 2 and 3, when the block 2, 3 is deformed due to deflection against the ground under the footprint the flexible portions 10 are deformed leading the respective grip edges 10a to project from the rolling surface "S" of the tread band 1. Under this circumstance specific pressures of high value are generated on the grip edges 10a, which will promote the tire grip on the ground. This phenomenon is emphasized when, in the accelerating and braking steps, the ground transmits tangential forces to the block 2, 3, which are directed in the opposite direction to that towards which the acute angles formed by the grip edges 10a of the respective deformable portions 10 are turned. Being the sipes 8, 9 of the first and second series are oriented in opposite ways, both in an accelerating condition and in a braking condition there will be blocks 2 or 3 in the footprint the deformable portions of which are suitable for efficiently transmitting the involved tangential forces.

In addition, the concave extension of the transverse sipes 8, 9 is of such a nature that, mainly when a longitudinal sliding of block 2, 3 on a snow-covered or frozen roadway starts, the grip edges 10a of the flexible portions 10 tend to pick up and accumulate snow and ice towards the longitudinal centre line of the block itself, entrapping them at the inside of the sipe 8, 9. Thus a further favourable condition for transmission of tangential forces is determined, being the friction created by snow against snow greater than friction of rubber on snow. Snow and/or ice accumulation in the transverse sipes 8, 9 also emphasizes deformation of the flexible portions 10 and, therefore, projection of the grip edges 10a.

In accordance with a further aspect of the invention, in order to improve the tire behaviour it may be advantageously provided that each transverse groove 5, preferably extending in a direction parallel to the extension of the sipes 8, 9 should be confined between a first side 11 substantially normal to the rolling surface "S" and a second side 12 diverging from the first side 11 in the direction of the rolling surface itself. Preferably, the second side 12 of each transverse groove 5 has an orientation parallel to, or at all events concordant with the orientation of the transverse groove 5 itself. Just as an indication, the second side 12 of each transverse hollow may define an angle of a value included between 20° and 35° relative to a direction normal to the rolling surface "S".

In this way each transverse groove 5 may be given an important width, which is advantageous for an efficient draining of water when the tire is run on wet roadways, and the flexible portions 10 projecting into the groove itself may substantially have the same shape as that of the remaining flexible portions 10 or a similar one. This aspect is particularly advantageous also for even wearing of blocks 2, 3.

It may be also advantageously provided that each block 2, 3 should have, at the second side 12 of the respective transverse hollow 5, a transverse edge 13 projecting towards the inside of the groove itself. This transverse edge 13, located close to the rolling surface "S" advantageously forms an undercut 13a with the second side 12 of the transverse groove 5.

Under this circumstance the projecting edge 13 is adapted to supply a further grip seat on the ground, as well as to promote accumulation of snow and ice within the transverse groove 5, especially all when the block 2, 3 has a tendency to slide on the snow-covered surface in an opposite direction relative to the orientation of the respective grip edges 10a.

In a preferential embodiment, each of the longitudinal grooves 4 too is provided to be confined between a respective first side 14 substantially normal to the rolling surface "S" and a second side 15 diverging from the first side 14 preferably with an inclination included between 20° and 35°, in the direction of the rolling surface itself.

As can be viewed from a comparison between FIGS. 4 and 5, taking into account the corresponding lines IV and V reproduced in FIG. 1, it is also preferably provided that the mutual positioning of the first and second sides 14 and 15 in each longitudinal groove 4 should be inverted relative to the configuration found in the circumferentially adjacent longitudinal grooves 4.

In addition, each block 2, 3 may have at least one longitudinal edge 16 projecting towards the respective longitudinal groove 4, so as to define an undercut 16a with the second side 15 of the longitudinal groove itself.

In order to further improve tractive power and braking performance of the tire, each of the flexible portions 10 may be also provided to have one or both ends 10b thereof oriented obliquely relative to the longitudinal groove or grooves 4 delimiting the respective block 2, 3. Thus side toothings projecting into the longitudinal grooves 4 are defined in block 2, 3, the presence of said toothings improving the grip effect of the tire on snow-covered roadways.

The present invention thus achieves the intended purposes.

The innovative expedients proposed by the invention in fact represent important improvements in terms of traction power and braking performance of the tire, particularly due to the particular conformation and arrangement of the sipes.

The particular profile in section of the transverse and longitudinal grooves, also leaving out of consideration the curvilinear-extention conformation of the sipes, cooperates in a synergic manner with said sipes in improving the operating behaviour of the block with further improvements in terms of traction power and braking performance. In addition, the conformation of the longitudinal and transverse grooves ensures an excellent wearing evenness of the individual blocks, eliminating or at all events greatly restricting phenomena of early wear at the perimetral edges of the blocks themselves. The conformation of the longitudinal and transverse grooves in addition ensures an efficient water removal from the footprint when the tire is run on a wet roadway.

The transverse 13 and the longitudinal 16 projecting edges exhibited by blocks 2, 3 close to the rolling surface also help in improving tractive power and braking performance.

On the other hand, it is to note that said projecting edges are located at the block regions where, by effect of deformation of the flexible portions, the involved specific pressures are of a relatively moderate amount. Therefore corners formed by the projecting edges are not affected by localized early wearing phenomena.

What is claimed is:

1. A tire for vehicle wheels, provided with a tread band, comprising:

a plurality of raised blocks, each peripherally confined between at least two longitudinal grooves, substantially extending circumferentially of the tire, and at least two traverse grooves meeting the longitudinal grooves; and a first series of sipes and a second series of sipes formed in the blocks, each sipe formed according to an inclined orientation relative to a direction normal to an outer rolling surface of the tread band to divide each block into a plurality of flexible portions disposed circumferentially in side-by-side relationship, each flexible portion having a grip edge in a form of an acute angle on the outer rolling surface of the tread band;

wherein each sipe extends transversely of a respective block according to a concave extension toward a grip edge of a corresponding flexible portion, wherein each of the transverse grooves is confined between a first side, substantially normal to the outer rolling surface of the tread band, and a second side, diverging from the first side toward the outer rolling surface of the tread band, and wherein each block has, close to the rolling surface of the tread band, at least one transverse edge projecting toward a corresponding transverse groove to define an undercut with the second side of the corresponding transverse groove.

2. A tire for vehicle wheels, provided with a tread band, comprising:

a plurality of raised blocks, each peripherally confined between at least two longitudinal grooves, substantially extending circumferentially of the tire, and at least two transverse grooves meeting the longitudinal grooves; and a first series of sipes and a second series of sipes formed in the blocks, each sipe formed according to an inclined orientation relative to a direction normal to an outer rolling surface of the tread band to divide each block into a plurality of flexible portions disposed circumferentially in side-by-side relationship, each flexible portion having a grip edge in a form of an acute angle on the outer rolling surface of the tread band;

wherein each sipe extends transversely of a respective block according to a concave extension toward a grip edge of a corresponding flexible portion, wherein each of the transverse grooves is confined between a first side, substantially normal to the outer rolling surface of the tread band, and a second side, diverging from the first side toward the outer rolling surface of the tread band, wherein each of the longitudinal grooves is confined between a third side, substantially normal to the outer rolling surface of the tread band, and a fourth side, diverging from the third side toward the outer rolling surface of the tread band, and wherein each block has, close to the outer rolling surface of the tread band, at least one longitudinal edge projecting toward a corresponding longitudinal groove to define an undercut with the fourth side of the corresponding longitudinal groove.

3. A tire for vehicle wheels, provided with a tread band, comprising:

a plurality of raised blocks, each peripherally confined between at least two longitudinal grooves, substantially extending circumferentially of the tire, and at least two transverse grooves meeting the longitudinal grooves; and a first series of sipes and a second series of sipes formed in the blocks, each sipe formed according to inclined orientation relative to a direction normal to an outer rolling surface of the tread band to divide each block into a plurality of flexible portion in side-by-side relationship, each flexible portion having a grip edge in a on the outer rolling surface of the tread band;

wherein each sipe extends transversely of a respective block according to a concave extension toward a grip edge of a corresponding flexible portion, wherein each of the transverse grooves is confined between a first side, substantially normal to the outer rolling surface of the tread band, and a second side, diverging from the first side toward the outer rolling surface of the tread band, wherein each of the longitudinal grooves is confined between a third side, substantially normal to the outer rolling surface of the tread band and a fourth side, diverging from the third side toward the outer rolling surface of the tread band, and wherein in each of the longitudinal grooves, mutual positioning of the third and fourth sides is inverted relative to mutual positioning of the third and fourth sides of circumferentially-contiguous longitudinal grooves.

4. A tire for vehicle wheels, provided with a tread band, comprising:

a plurality of raised blocks, each peripherally confined between at least two longitudinal grooves, substantially extending circumferentially of the tire, and at least two transverse grooves meeting the longitudinal grooves; and a first series of sipes and a second series of sipes formed in the blocks, each sipe formed according to an inclined orientation relative to a direction normal to an outer rolling surface of the tread band to divide each block into a plurality of flexible portions disposed circumferentially in side-by-side relationship, each flexible portion having a grip edge in a form of an acute angle on the outer rolling surface of the tread band;

wherein each sipe extends transversely of a respective block according to a concave extension toward a grip edge of a corresponding flexible portion, wherein the sipes belonging to the first series and the second series are distributed in respective circumferential rows of blocks disposed axially in side-by-side relationship and each row of blocks has sipes oriented in a direction opposite to that of sipes of adjacent toward of blocks, wherein the sipes belonging to the first series and the second series have a depth approximately equal to a depth of the transverse and longitudinal grooves, wherein each of the transverse grooves is confined between a first side, substantially normal to the outer rolling surface of the tread band, and a second side, diverging from the first side toward the outer rolling surface of the tread band, and wherein the second side of each of the transverse grooves has an orientation concordant with that of the sipes of a corresponding block, relative to the outer rolling surface of the tread band.

5. The tire of claim 4, wherein the transverse grooves have a width progressively increasing on moving away from an equatorial plane of the tire.

6. The tire of claim 4, wherein each sipe extends transversely of a respective block substantially over an entire width of the respective block.

7. The tire of claim 6, wherein each sipe has at least one end portion of reduced depth close to a respective longitudinal groove delimiting the respective block.

8. The tire of claim 4, wherein each sipe has a substantially curvilinear extension symmetric with respect to a longitudinal centerline of a respective block.

9. The tire of claim 4, wherein each of the flexible portions has at least one end inclined with respect to an extension direction of a corresponding longitudinal groove to define, in a respective block, side toothings projecting into the corresponding longitudinal grooves.

10. The tire of claim 4, wherein each block has, close to the outer rolling surface of the tread band, at least one transverse edge projecting toward a corresponding transverse groove to define an undercut with the second side of the corresponding transverse groove.

11. The tire of claim 4, wherein each of the transverse grooves extends in a direction substantially parallel to the extension of the sipes.

12. The tire of claim 4, wherein the transverse grooves belonging to blocks disposed mutually in side-by-side relationship in an axial direction are consecutively disposed to define substantially continuous transverse grooves extending according to an undulated course.

13. The tire of claim 4, wherein each of the longitudinal grooves is confined between a third side, substantially normal to the outer rolling surface of the tread band, and a fourth side, diverging from the third side toward the outer rolling surface of the tread band.

14. The tire of claim 4, wherein the longitudinal grooves are consecutively disposed to define substantially-continuous circumferential grooves.

15. The tire of claim 14, wherein each of the longitudinal grooves has an inclined extension relative to a direction circumferential to the tire so that each of the substantially-continuous circumferential grooves extends in a form of a broken line.

16. The tire of claim 4, wherein at least two circumferential rows of shoulder blocks are provided which extend close to opposite side edges of the tread band, as well as one or more circumferential rows of center blocks disposed symmetrically relative to an equatorial plane of the tire, the shoulder blocks disposed on either side of the equatorial plane of the tire having opposite orientations, and the center blocks disposed on either side of the equatorial plane of the tire having opposite orientations.

* * * * *

UNITED STATES PATENT AND TRADEMARK OFFICE
CERTIFICATE OF CORRECTION

PATENT NO.   : 6,382,283 B1
DATED        : May 7, 2002
INVENTOR(S)  : Renato Caretta It is certified that error appears in the above-identified patent and that said Letters Patent is hereby corrected as shown below:

<u>Column 7,</u>
Line 50, "tranverse" should read -- transverse --.

<u>Column 8,</u>
Line 48, before "inclined" insert -- an --.
Line 51, "portion in" should read -- portions disposed circumferentially in --.
Line 53, before "on the" insert -- form of an acute angle --.
Line 65, after "tread band" insert -- , --.

<u>Column 9,</u>
Line 30, "toward of" should read -- rows of --.

Signed and Sealed this

Twenty-eighth Day of January, 2003

JAMES E. ROGAN
*Director of the United States Patent and Trademark Office*